V. HECHLER.
APPARATUS FOR MANUFACTURING SHORTENING MATERIAL.
APPLICATION FILED APR. 23, 1919.
1,400,216.
Patented Dec. 13, 1921.
2 SHEETS—SHEET 2.
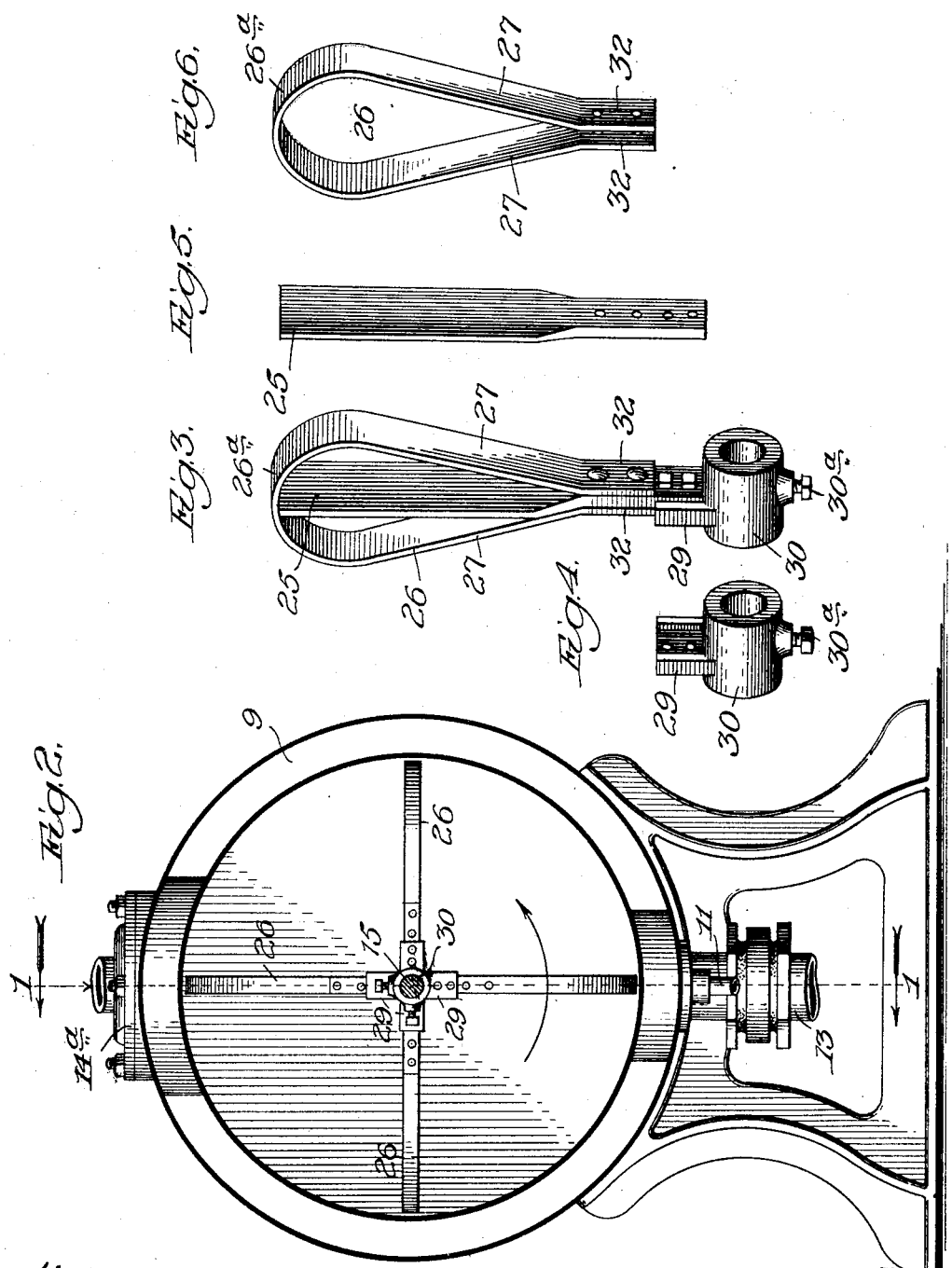
Witnesses:
 Taylor
A. Kobarik.
Inventor:
Valentine Hechler,
By Dyrenforth, Lee, Chritton & Wiles,
Attys

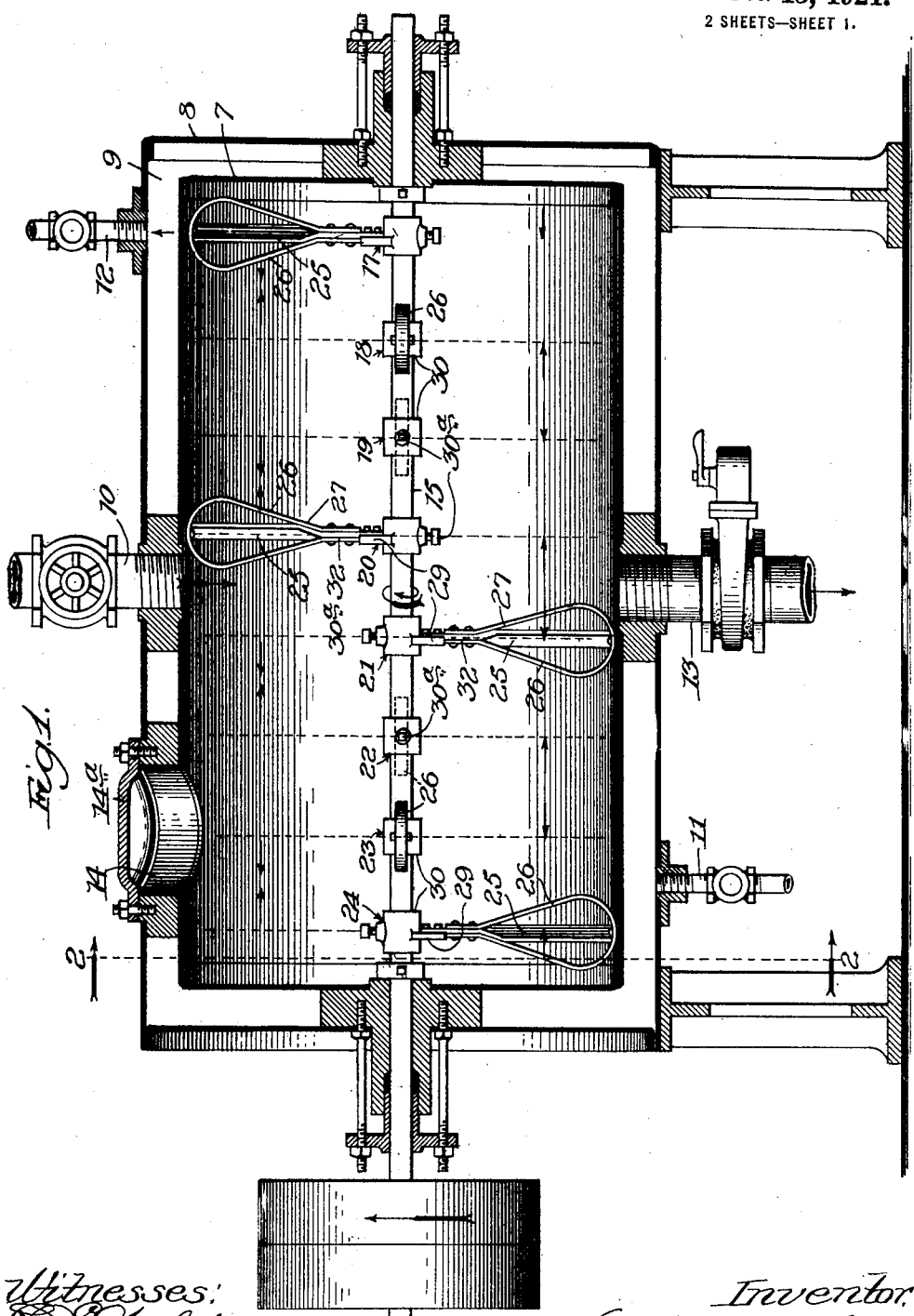

UNITED STATES PATENT OFFICE.

VALENTINE HECHLER, OF CHICAGO, ILLINOIS, ASSIGNOR TO WILSON & CO., INC., OF CHICAGO, ILLINOIS, A CORPORATION OF NEW YORK.

APPARATUS FOR MANUFACTURNG SHORTENING MATERIAL.

1,400,216.

Specification of Letters Patent.

Patented Dec. 13, 1921.

Application filed April 23, 1919. Serial No. 292,090.

*To all whom it may concern:*

Be it known that I, VALENTINE HECHLER, a citizen of the United States, residing at Chicago, in the county of Cook and State of Illinois, have invented a new and useful Improvement in Apparatus for Manufacturing Shortening Material, of which the following is a specification.

My invention relates to improvements in apparatus for the manufacture of shortening compounds, and more particularly to the manufacture of what is termed "compound lard," composed of vegetable oil, such as cotton-seed oil, and any desirable hard fat, as for example, stearin; and my primary objects are to improve upon shortening compounds as hitherto provided and to economically produce such material of fine crystalline form, uniform throughout the mass, and the color and pureness of which shall be improved, and material, of such character that it will require subjection to higher heat, than in the case of such compounds as now commonly produced, to separate its ingredients which, in order that the material be acceptable commercially, must be maintained in properly combined condition.

Referring to the accompanying drawings:

Figure 1 is a view in horizontal sectional elevation of a form of apparatus by which my invention may be utilized. Fig. 2 is a section taken at the line 2—2, on Fig. 1, and viewed in the direction of the arrows. Fig. 3 is a perspective view of one of the plurality of similar agitating elements employed. Fig. 4 is a similar view of the socket-equipped head of the agitating element. Fig. 5 is a similar view of the propelling vane of the element; and Fig. 6, a similar view of the cutter portion of the element.

The apparatus as shown is formed of an inner and an outer cylindrical shell 7 and 8, respectively, spaced apart as represented, to form the space 9 surrounding the inner shell 7 which is connected with an inlet pipe 10 through which the material to be operated on is introduced into the shell 7, and with an inlet pipe 11 for introducing the cooling medium, such as water, into the space 9, which passes from the space 9 through an outlet pipe 12, thereby permitting of the continuous flow of cooling water in contact with the shell 7. The shell 7 also communicates with a discharge pipe 13 for the discharge of the material from the apparatus after the treatment of the same in the shell 7 has been completed, and opening through the shells 7 and 8 is a manhole 14 controlled by a cover 14ª through which access may be had to the shell 7, as for cleaning it.

Journaled at its ends in the ends of the shells 7 and 8 to extend concentrically through these shells, is a shaft 15 driven in any suitable manner (not shown) in the direction of the arrow in Fig. 1, as through the medium of the pulley thereon represented at 16. This shaft at intervals is provided with propeller and cutter elements which, in the preferred arrangement shown, are embodied in combination devices, represented at 17 to 24, inclusive, there being eight of these devices in the particular arrangement illustrated, though the number may be varied. Each one of these devices is formed of a vane-member 25 inclined relative to the plane in which it travels when the shaft 15 is rotated, and a cutter-member 26 preferably of the bow-form shown which encircles the vane 25 extending at opposite sides thereof as shown, its sides adjacent the bowed part 26ª thereof converging as represented at 27. The members 25 are secured, as by bolts 28, to socket-portions of bosses 29 carried by sleeves 30 surrounding the shaft 15 and keyed thereto, as by the set-screws 30ª, and the cutter-members 26 are secured, as by rivets 31, at their deflected free end portions 32, to the members 25 against which they flatwise fit as shown in the drawings. The propeller and cutter-devices 17 to 24, inclusive, are equidistantly spaced along the shaft 15 and are so proportioned that they move in close proximity to the end walls and cylindrical side wall of the shell 7 as shown. In the particular arrangement shown, and by preference, the devices 17 and 18 are arranged on the shaft 15 at an angle to each other of approximately 90° and their propeller members 25 are so disposed as to drive the material in the shell 7 in the direction as indicated by the arrows adjacent thereto; the device 19 is arranged at an angle of substantially 180° to the device 18, and the device 20 at an angle of substantially 90° to the device 19, the latter occupying the same angular position on the shaft 15 as the device 17; the propeller members 25 of the devices 19 and 20 being so arranged that the material in the shell 7 will be forced in the directions as indicated by the arrows adjacent thereto; the device 21 is arranged at an angle of substantially 180° to the device 20 and the device 22 at an angle of substantially 90° to the device 21, the device 22 occupying the same angular position on the shaft 15 as the device 19, the propeller members 25 of the devices 21 and 22 being so arranged as to force the material in the direction of the arrows adjacent thereto; the device 23 is arranged at an angle of substantially 180° to the device 22 and the device 24 at an angle of substantially 90° to the device 23 and occupying the same angular position on the shaft as the device 21, the propeller members 25 of the devices 23 and 24 being so arranged that the material will be forced in the direction of the arrows adjacent thereto.

In the use of the apparatus the material to be operated on, as, for example, a heated fluid mixture of vegetable oil, such as is commonly used, and which may be cottonseed oil, and a hard fat, as, for example, stearin, which may be any suitable vegetable or animal stearin in the proportion for example of 80 to 90 parts of vegetable oil and 10 to 20 parts of stearin, is charged into the shell 7 preferably to within a short distance of the upper portion of the shell 7 wherein it is subjected to the cooling action of the cooled shell 7 and simultaneously therewith to the action of the agitating devices 17 to 24, inclusive, which in the rotation of the shaft 15, preferably at about 120 to 130 revolutions per minute, operate, by the action of the members 25, to circulate the material in the shell 7 and subject it, by the action of the members 26, to a cutting or slicing action, until the material reaches a temperature of about 100° F., when it is discharged from the apparatus through the outlet 13. The result of thus operating on the material is to thoroughly agitate it during cooling and otherwise so manipulating it, that the finished material is of fine crystalline form, of substantial uniformity and good color, and the intermixture of the vegetable oil and hard fat is such that the material presents high resistance to the separation of the hard fat from the vegetable oil under normal atmospheric conditions thereby rendering the product of great commercial value. This manner of operating on the material having been found especially useful in the manufacture of shortening material wherein the stearin is a vegetable stearin, and producing a material which is very acceptable commercially.

While I have illustrated and described a particular construction embodying my invention, I do not wish to be understood as intending to limit it thereto as the same may be variously modified and altered without departing from the spirit of my invention, it being my intention to claim my invention as fully and completely as the prior state of the art will permit.

What I claim as new and desire to secure by Letters Patent is:

1. In an apparatus of the character set forth, in combination, a container for the material, a rotatably mounted member in said container, a series of propeller devices arranged at different points on said member, and a series of bow-shaped devices on said member closely adjacent the sides of said propeller devices.

2. In an apparatus of the character set forth, the combination of a container for the material to be operated on, a rotatably mounted member in said container, a series of propeller devices on said member and arranged at different points along the latter, and a series of bow-shaped cutter devices on said member and surrounding said propeller devices.

3. In an apparatus of the character set forth, in combination, a container for the material to be operated on, a rotatably mounted member in said container, a series of sets of propeller devices on said rotatable member, the members of each set being arranged to force the material operated on in a direction toward each other, and a series of cutter devices on said rotatable member and disposed closely adjacent the sides of said propeller devices.

4. In an apparatus of the character set forth, the combination of a container for the material to be operated on, a series of sets of propeller devices in said container, the members of each set being arranged to force the material operated on in a direction toward each other, and a series of cutter devices disposed closely adjacent the opposite sides of said propeller devices.

5. In an apparatus of the character set forth, the combination of a container for the material to be operated on, a rotatably-mounted member in said container, a series of propeller devices on said member and arranged at different points along the latter and occupying different positions angularly about said member, and a series of bow-shaped devices on said member arranged at different points along the latter and disposed in close flanking relation to said propeller devices.

6. In an apparatus of the character set forth, the combination of a container for the material to be operated on, means in said container operating against the material therein and operating to shift the material acted on back and forth in the container, and bow-shaped cutter devices in said container and surrounding said material shifting means and operating to exert a cutting action on the material.

7. In an apparatus of the character set forth, a receptacle, a rotary shaft in said receptacle, a plurality of propelling mixing blades on said shaft, a cutting blade closely adjacent the sides of each mixing blade, the said blades lying in planes substantially radial to the shaft.

8. In an apparatus of the character set forth, a receptacle, a shaft in said receptacle, a plurality of propelling mixing blades extending from said shaft, and cutting blades closely adjacent said mixing blades and lying in planes substantially radial to the shaft, certain of said cutting blades being adapted to quickly check the movement of mixed material caused by said mixing blades, 9. In an apparatus of the character set forth, a receptacle, a shaft in said receptacle, a plurality of propelling mixing blades extending from said shaft, a cutting blade closely adjacent each mixing blade on each side thereof, said cutting blades lying in planes radial to the shaft.

10. In an apparatus of the character set forth, a receptacle, a rotary shaft in said receptacle, a plurality of sets of axially separated propeller mixing blades on said shaft, each set comprising a pair of blades spaced angularly relatively near to each other and adapted to propel material toward a plane between the pair and the blades of the sets spaced angularly relatively far apart.

11. In an apparatus of the character set forth, a receptacle, a rotary shaft in said receptacle, a plurality of sets of axially separated propeller mixing blades on said shaft, each set comprising a pair of blades spaced angularly substantially 90° from each other and adapted to direct material toward a plane between them, the leading blade of one set being spaced angularly substantially 180° from the following blade of the adjacent set.

VALENTINE HECHLER.